United States Patent [19]

Barton et al.

[11] 3,768,850
[45] Oct. 30, 1973

[54] PNEUMATIC FLEXIBLE BUMPER

[75] Inventors: David W. Barton, Birmingham; George H. Muller, Ann Arbor, both of Mich.

[73] Assignee: Ford Motor Company, Dearborn, Mich.

[22] Filed: Nov. 24, 1971

[21] Appl. No.: 201,828

Related U.S. Application Data

[63] Continuation of Ser. No. 836,776, June 26, 1969, abandoned.

[52] U.S. Cl. .............................. 293/71 P, 267/140
[51] Int. Cl. ............................................. B60r 19/10
[58] Field of Search .................. 293/71 R, 71 P, 70, 293/72; 114/219; 267/140

[56] References Cited
UNITED STATES PATENTS

| | | | |
|---|---|---|---|
| 3,335,689 | 8/1967 | Hein | 114/219 |
| 2,188,082 | 1/1940 | Imhofe | 293/71 R |
| 527,820 | 10/1894 | Tallman | 152/339 |
| 2,731,290 | 1/1956 | Corydon | 293/71 P |
| 3,588,159 | 6/1971 | Duckett | 293/71 R |
| 2,910,033 | 10/1959 | Weisburg | 114/219 |
| 3,019,758 | 2/1962 | Erkert | 114/219 |

*Primary Examiner*—Gerald M. Forlenza
*Assistant Examiner*—Robert Saifer
*Attorney*—John R. Faulkner et al.

[57] ABSTRACT

A flexible, pneumatic bumper adapted for motor vehicle applications. A plurality of individual chambers are defined by a resiliently deformable outer bumper shell, a supporting plate secured to the vehicle structural members and a plurality of separator elements extending from the bumper shell and removably connected to the supporting plate. When the outer bumper shell is forced inwardly due to an impact force, resultant chamber deformation causes an increase in chamber pressure that is relieved by air being forced out of chamber through pressure relief valves that vent each chamber. Following impact, return of the bumper shell to its original shape is slowed by a restricted air flow into the chambers through the valves, thereby preventing bumper rebound forces.

5 Claims, 5 Drawing Figures

Patented Oct. 30, 1973
3,768,850
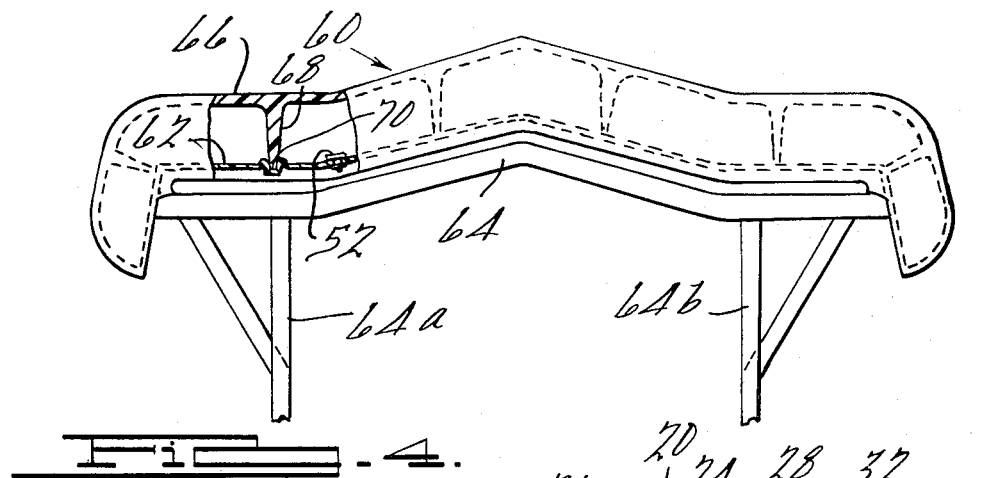
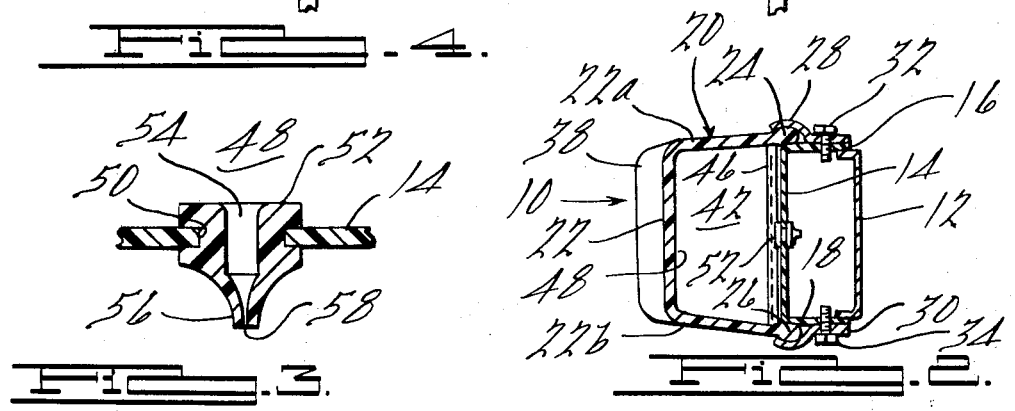
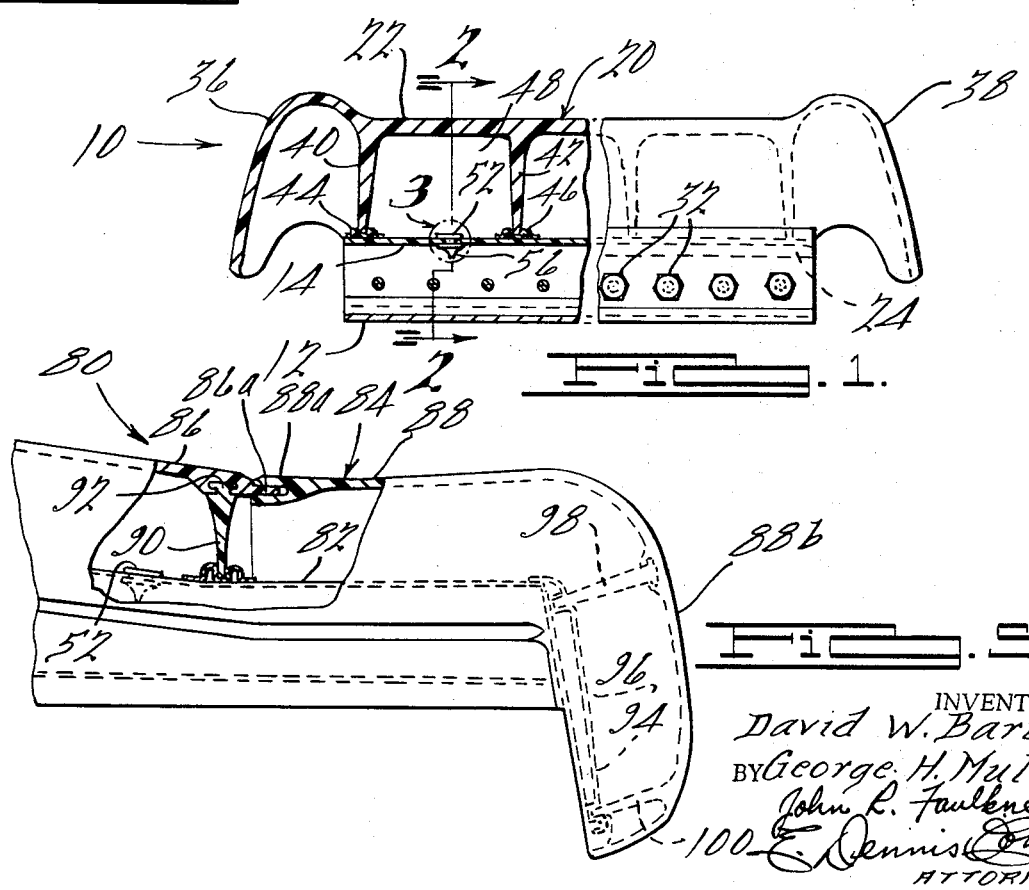
INVENTORS.
David W. Barton
BY George H. Muller
John R. Faulkner
E. Dennis Connor
ATTORNEYS.

PNEUMATIC FLEXIBLE BUMPER

This is a continuation of application Ser. No. 836,776, filed June 26, 1969, now abandoned.

BACKGROUND OF THE INVENTION

The prior art details numerous disclosures of flexible, motor vehicle bumpers that take advantage of the large energy absorbing capabilities of fluid systems. It is believed that such bumpers have been restricted in their feasible production applications by two factors: lack of reliability and relatively great manufacturing costs.

Liquid filled bumpers and bumpers wherein a gas is encapsulated under pressure are prone to develop leaks. This is because the outer shells of such bumpers must be constructed from elastomeric materials that are subject to puncture during normal vehicle operation. In addition, known flexible bumpers including single or multiple, self-contained fluid chambers are difficult and costly to manufacture and can be secured to the vehicle structure to be protected only by relatively complex and expensive attachment means.

It is an object of this invention to provide a flexible, energy absorbing bumper adapted for use on a motor vehicle that takes advantage of the energy absorbing potential of fluid systems, but avoids the drawbacks to such bumpers encountered in the prior art and detailed above. More particularly, this invention provides a pneumatic bumper wherein air chambers are defined by a support plate and an elastomeric member that may be manufactured by conventional techniques that are compatible with high volume, low cost production. Small leaks in the structure defining these chambers do not affect bumper reliability because the air encapsulated therein normally is at atmospheric pressure and is pressurized during an impact at too great a rate to be significantly affected by such leaks. Futhermore, the bumper of this invention is reusable as the elastomeric member returns to its original shape following an impact thereupon. This return to its original shape by the elastomeric member occurs without giving rise to objectionable rebound forces.

SUMMARY OF THE INVENTION

An energy absorbing bumper assembly constructed in accordance with this invention is adapted to be utilized for protecting motor vehicle structure from impact damage. The bumper assembly includes a portion of the vehicle structure comprising a bumper mounting plate. A resilienty deformable bumper shell means is operatively secured to the mounting plate and cooperates therewith to define a chamber therebetween. A plurality of resiliently deformable separator means extend from the inside surface of the bumper shell through the chamber to the mounting plate and divide the chamber into a plurality of individual cells. Plural indentation means are formed on the mounting plate. The end of each of the separator means remote from the bumper shell means is removably positioned in one of the indentation means formed in the bumper plate. Each of the individual chamber portions is vented to the atmosphere through a pressure release valve mounted in one of a plurality of apertures formed through the mounting plate.

DESCRIPTION OF THE DRAWING

FIG. 1 is a plan view with parts broken away of a first embodiment of pneumatic flexible bumper constructed in accordance with this invention;

FIG. 2 is a sectional view taken along the line 2—2 of FIG. 1;

FIG. 3 is an enlarged view of that portion of the structure of FIG. 1 located within the circle three; and FIG. 4 is a view similar to FIG. 1, but illustrating a second embodiment of pneumatic flexible bumper constructed in accordance with this invention; and FIG. 5 is a partial plan view, having parts broken away, of a third embodiment of pneumatic flexible bumper constructed in accordance with this invention.

DETAILED DESCRIPTION OF THE INVENTION

Referring now to FIGS. 1 and 2 of the drawing, the numeral 10 denotes a first embodiment of the flexible, pneumatic bumper of this invention. The numeral 12 identifies a vehicle structural member such as a front frame member. A bumper mounting plate 14, having an upper arm 16 and a lower arm 18, is secured by conventional joining techniques, such as welding, to structural member 12. The joints between mounting plate 14 and structure 12 are located along the upper and lower arms 16 and 18 of the mounting plate.

The bumper assembly includes an elastomeric member 20 that is resiliently deformable and is constructed of material such as dense urethane foam or rubber. The elastomeric member 20 has a main body or shell 22 that is spaced from mounting plate 14, an upper arm 22a extending from shell 22 to mounting plate 14 and a lower arm 22b extending from the shell to the bottom of the mounting plate. Enlarged beads 24 and 26 are formed on the ends of arms 22a and 22b respectively.

Elastomeric member 20 is secured to plate 14 by means of a clamp type connection. This connection includes a pair of clamps 28 and 30 secured to upper and lower mounting plate arms 16 and 18, respectively, by fasteners 32 and 34. These clamps essentially are S-shaped and engage beads 24 and 26 to maintain the elastomeric member in the position illustrated in FIGS. 1 and 2.

As best may be seen in FIG. 1, the end portions 36 and 38 of shell 22 are arcuate and curve about the side of mounting plate 14. With bumper 10 mounted on a motor vehicle, end portions 36 and 38 would extend about the fenders of the vehicle as do conventional metal bumpers to give increased protection to the vehicle sheet metal.

A plurality of separator members, two of which are identified in FIG. 1 by the numerals 40 and 42, integrally are formed with shell 22 and extend therefrom across the space between shell 22 and mounting plate 14. A plurality of brackets having grooves formed therein, two of said brackets being identified in FIG. 1 by the numerals 44 and 46, are secured to mounting plate 14 such that the separator members will register therewith. As may be seen in FIG. 1, the ends of separator members 40 and 42 remote from shell 22 are received in the grooves defined by brackets 44 and 46 respectively. This positioning of the end portions of the separator member in the grooved brackets provides for an air tight seal between these members while not impeding easy assembly of the elastomeric member 20 with the mounting plate 14.

The cooperation between separators 40 and 42 and brackets 44 and 46 allow the definition of an air tight chamber 48 defined by shell 22, mounting plate 14 and separators 40 and 42. It may be appreciated by reference to the drawings that a plurality of such chambers are defined along the length of the elastromeric member 20.

As best may be seen from FIGS. 2 and 3 of the drawing, chamber 48 is vented to the atmosphere through an aperture 50 formed in mounting plate 14. Positioned in aperture 50 is a valve 52. This valve has a passageway 54 extending therethrough. The end of passageway 54 remote from chamber 48 has a portion 58 of reduced cross sectional area defined by a valve lip 56.

The bumper assembly illustrated in FIGS. 1 to 3 is operative to protect the structure 12 and other attendant vehicle structure due to its capability of absorbing impact energy. This absorption of energy is due to the fact that the chambers, such as chamber 48, comprise pneumatic chambers. Under normal conditions, elastomeric member 20 is in the undeformed condition illustrated in the drawing and chamber 48 is filled with air at atmospheric pressure. This pressure is insured by the communication of chamber 48 with the atmosphere through the small opening 58 in valve 52. Upon shell 22 of elastomeric member 20 being impacted, the elastomeric member is deformed as by shell 22 being pushed inwardly toward mounting plate 14. A reduction in size of chamber 48 thus occurs. The small opening 58 in valve 52 does not allow quick passage of large amounts of air from chamber 48 to the atmosphere. In face, valve 52 greatly impedes the flow of air through aperture 50 so that the speedy reduction in size of chamber 48 results in an immediate rise in the air pressure within the chamber. The energy required to deform elastomeric member 20 and the energy required to force pressurized air from the chamber 48 through the valve is absorbed from the total energy of the impact force.

Upon the pressure within chamber 48 reaching a predetermined magnitude, lip 56 of valve 52 will open somewhat and opening 58 will become enlarged and will allow a greater volume of air to pass from chamber 48 through aperture 50. Valve 52 thus acts as a pressure relief valve and insures that chamber 48 acts as a cushioning member against an impact force directed against shell 22. The functioning of the chamber 48 described above is repeated, of course, for all the pneumatic chambers formed along the length of elastomeric member 20.

Following the termination of the application of an impact force to shell 22, the elastomeric member, being resiliently deformable, will return to its original configuration. The return to the original configuration by the elastomeric member somewhat is impeded by the design of valve 52. Since opening 58 is small, valve 52 inhibits greatly the passage of air from the ambient atmosphere back into the partially exhausted chamber 48. The return of the elastomeric member 20 to its original position thus is controlled so that movement toward the original configuration occurs quite slowly. This slow return of elastomeric member 20 to its normal configuration insures that excessive rebound forces caused by the resiliency of member 20 do not occur and that an undersirable bounce effect is prevented.

Elastomeric member 20, including the end portions 36 and 38 of shell 22 and separators 40 and 42, may be an integrally formed molding of elastomeric material and thus easily may be manufactured by large volume production techniques. It may be appreciated that a puncture in elastomeric member 22 does not operate to render the bumper ineffective tin the absorption of energy. The hole caused by such a puncture would be quite small, even compared to the restricted orifice 58 of valve 52. During the sudden deformation of the elastomeric walls defining chamber 48, a small puncture hole would not allow a quick escape of the air from the chamber and thus would have no significant effect on the pressures within chamber 48.

FIGS 4 and 5 illustrate second and third embodiments, respectively, of the energy absorbing bumper of this invention. Unless specifically noted in the description below, the bumper assemblies of these second and third embodiments are identical to the embodiment illustrated in FIGS. 1 through 3 and described in detail above.

Referring now to FIG. 4, the numeral 60 denotes a second embodiment of pneumatic, flexible bumper constructed in accordance with this invention and adapted to protect a motor vehicle structure including a front structural member 64 that is connected to side frame rails 64a and 64 b. A bumper mounting plate 62 is secured, as by welding, to member 64. The elastomeric member of bumper assembly 60 includes an outer shell 66 and a plurality of separator members, one of which is identified by the numeral 68.

Bumper assembly 60 has a simplified construction relative to the bumper assembly 10 of FIGS. 1 and 2, in that mounting plate 62 has integrally formed therein a plurality of grooves, one of which is identified by the reference numeral 70. These integrally formed grooves are positioned so as to register with the end portion of the separator members that extend to a mounting plate 62 from the shell 66. As illustrated in FIG. 4, the end of separator member 68 remote from shell 66 is positioned within groove 70.

As discussed above, the mounting of elastomeric member separator elements within groove means formed on the bumper mounting plates of the embodiment of this invention are removable. This arrangement facilitates assembly of the pneumatic flexible bumper of the invention in that the elastomeric member need only be placed in its final position and secured by whatever connection means are utilized.

Referring now to FIG. 5 of the drawing, the numeral 80 denotes a third embodiment of pneumatic, flexible bumper assembly constructed in accordance with this invention. The design of bumper assembly 80 is adapted to facilitate assembly of this structure when a complex bumper shape is required. The bumper assembly 80 includes a backing plate 82 and an elastomeric member 84 that is a composite rather that an integrally formed member. Elastomeric member 84 has a first shell portion 86 with a tongue 86a extending therefrom. Adjacent first shell portion 86 is a second shell portion 88 having a bifurcated end portion 88a adapted to receive tongue 86a thereby providing for a connection between the shell portions 86 and 88.

Separator members extend from the composite shell members. One of the separator members is identified by the reference numeral 90 and has formed thereon a tenon 92. This tenon 92 is received in an undercut groove formed in shell portion 86. It thus may be seen that the bumper elastomeric member, if it need have a complex shape, may be formed as a composite from individual elastomeric members that simply may be put together due to the connection means described above.

Bumper assembly also is distinguished by the fact that the end portions of this assembly include pneumatic chambers. It may be seen that shell portion 88 has an end 88*b*, remote from bifurcated end 88*a*, that is arcuate and curved about the side of backing plate 82. A second backing plate 94, secured to backing plate 82 as by welding, is arranged to correspond to the profile of shell end portion 88*b*. A pair of separator members 98 and 100 extend from shell end portion 88*b* to the second mounting plate 94 such that a pneumatic chamber 96 is formed. It thus may be appreciated that bumper assembly 80 provides the energy absorbing potential of pneumatic chambers that may be utilized even if a vehicle equiped with this bumper assembly is not impacted directly from the front, but rather is impacted slightly from the side such that the impact force would be received by the end 88*b* of the shell portion 88.

It thus may be seen that this invention provides a pneumatic, flexible bumper distinguished in that the elastomeric portion thereof easily may be formed from either a single integral molding in the case of simple bumper shapes, or as a composite of individual moldings when complex bumper shapes are required. Puncture of the elastomeric member, that partially defines plural pneumatic chambers, does not impair the operability of the pneumatic bumper of this invention because the encapsulated air present within the pneumatic chambers normally is at atmospheric pressure. This air quickly becomes pressurized to a high value, however, upon an impact being received by the bumper and causing a resilient deformation thereof.

We claim:

1. An energy absorbing bumper assembly adapted to protect bumper mounting structure from impact damage, said assembly including a portion of said mounting structure comprising a bumper backing member, generally elongate resiliently deformably bumper shell means operatively secured to said backing member and cooperating therewith to define a chamber therebetween a plurality of resiliently deformable separator means extending from said shell means to said backing member and dividing said chamber into a plurality of individual portions, plural indentation means formed on said backing member, the end of each of said separator means remote from said shell means being removably positioned in one of said indentation means, said separator means being transversely disposed relative to the general longitudinal extent of the bumper assembly, said separator means having a first pair of generally opposite edges attached to the shell means and a second pair of generally opposite edges, one of which is attached to the shell means and the other of which is unattached to the shell means and free to slide within and relative to said indentation means in reponse to deformation of said bumper shell means.

2. An energy absorbing bumper assembly according to claim 1, wherein at least one of said individual chamber portions is vented to the atmosphere by a pressure relief valve mounted in an aperture formed through said backing member.

3. An energy absorbing bumper assembly according to claim 1, said shell means being a one piece element and said separator means being integrally formed with said shell means.

4. An energy absorbing bumper assembly according to claim 1, said assembly further including cooperating tongue and groove means formed on said shell means and each of said separator means and operative to removably secure said separator means to said shell means.

5. An energy absorbing bumper assembly according to claim 1, said shell means comprising a plurality of individual shell portions, cooperating tongue and groove means formed on said shell portions and operative to removably secure said shell portions together into a unitary shell.

* * * * *